(12) United States Patent
Chen

(10) Patent No.: US 6,223,570 B1
(45) Date of Patent: May 1, 2001

(54) HOUSING FOR AN AUTOMOBILE STEERING WHEEL LOCK

(76) Inventor: Tian-Yuan Chen, P. O. Box 90, Tainan City (TW)

( * ) Notice: Subject to any disclaimer, the term of this patent is extended or adjusted under 35 U.S.C. 154(b) by 0 days.

(21) Appl. No.: 09/563,943

(22) Filed: May 4, 2000

(51) Int. Cl.[7] .................................................. B60R 25/02
(52) U.S. Cl. .................................................. 70/209; 70/417
(58) Field of Search ...................... 70/209–212, 225, 70/226, 237, 238, 416, 417, 448, 449

(56) References Cited

U.S. PATENT DOCUMENTS

| | | | |
|---|---|---|---|
| 4,611,477 | * | 9/1986 | Crites .................................... 70/417 X |
| 4,918,949 | * | 4/1990 | Newbold ............................. 70/417 X |
| 5,005,388 | * | 4/1991 | Lo ........................................... 70/209 |
| 5,069,048 | * | 12/1991 | Lo ........................................... 70/209 |
| 5,157,951 | * | 10/1992 | Chen et al. ............................. 70/209 |
| 5,163,309 | * | 11/1992 | Wu .......................................... 70/209 |
| 5,255,544 | * | 10/1993 | Wu .......................................... 70/209 |
| 5,381,679 | * | 1/1995 | Cummins .............................. 70/209 |
| 5,802,896 | * | 9/1998 | Tsai ........................................ 70/417 |
| 6,131,426 | * | 10/2000 | Tarnofsky .............................. 70/209 |

* cited by examiner

Primary Examiner—Suzanne Dino Barrett

(57) ABSTRACT

A locking means housing for an elongate automobile steering wheel locking rod includes a circular tubular body for containing a locking means and a connector firmly welded with one side of the circular tubular body. The connector is made of a flat metal plate cut to a proper size and shape and then bent into a case shape to have a hollow space. The connector is hardened by a special treatment and may be made to suit the size of any elongate automobile steering wheel locking rod without requiring a mold and, resisting external breaking force and air corrosion after being hardened, thus enhancing the anti-theft effect.

1 Claim, 4 Drawing Sheets

HOUSING FOR AN AUTOMOBILE STEERING WHEEL LOCK

BACKGROUND OF THE INVENTION

This invention relates to a housing for an elongate automobile steering wheel lock, particularly to one having its outer surface hardened with special treatment, made of a flat metal plate without need of a mold to make it, preventing the locking means from forceful breakage to enhance anti-theft effect, and suffering minimum corrosion.

Common conventional automobile steering wheel locks are generally made of an upper housing and a lower housing combined together to make a locking means housing, having a passageway formed in one end of the locking means housing for a cylindrical rod and a small diameter rod to insert in for a deadbolt pushed by a spring to extend in to engage one of plural annular grooves formed on the small diameter rod to lock the extensible elongate steering wheel rod. And the conventional locking means housing for an elongate automobile steering wheel lock and the locking means are made as integral with aluminum alloy or zinc alloy, having disadvantages as follows.

1. The locking means and the housing are made of the same material, thereby making it impossible to harden the outer surfaces of these comoponents.

2. As the outer surface of the locking means housing is not. hardened with special treatment, it is liable to be broken by illegal force and lose its anti-theft effect.

3. As the outer surface of the locking means housing is not hardened with special treatment, it is liable to be corroded by air and become fragile to be easily broken or too worn off to use.

4. The conventional locking means and the upper housing are made integral, and many kinds of molds for different sizes of them are needed to cope with different type of automobile steel wheels, thereby increasing manufacturing cost a great deal.

SUMMARY OF THE INVENTION

The objective of the invention is to offer a locking means housing for an elongate automobile steering wheel lock having their outer surfaces separately hardened with special treatment, made of a flat metal plate without need of making a mold to save production cost and enhancing the anti-theft effect of an automobile.

The feature of the invention is a locking means housing for an elongate automobile steering wheel lock, consisting of a circular tubular body for containing a deadbolt and a spring to push elastically the deadbolt and a connector welded tightly with the circular tubular body for the deadbolt to extend in to engage one of plural annular grooves of a small diameter rod inserted in an outer side of the connector and to insert in an inner end of an elongate cylindrical rod portion for locking a steering wheel of an automobile. The feature of the connector is that it is made of a flat metal plate cut to a proper size and bent to form the case-shaped connector and then hardened by special treatment to resist external force to break the lock and air erosion. So it does not need any mold and is possible to be made to suit to any elongate automobile steering wheel lock.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
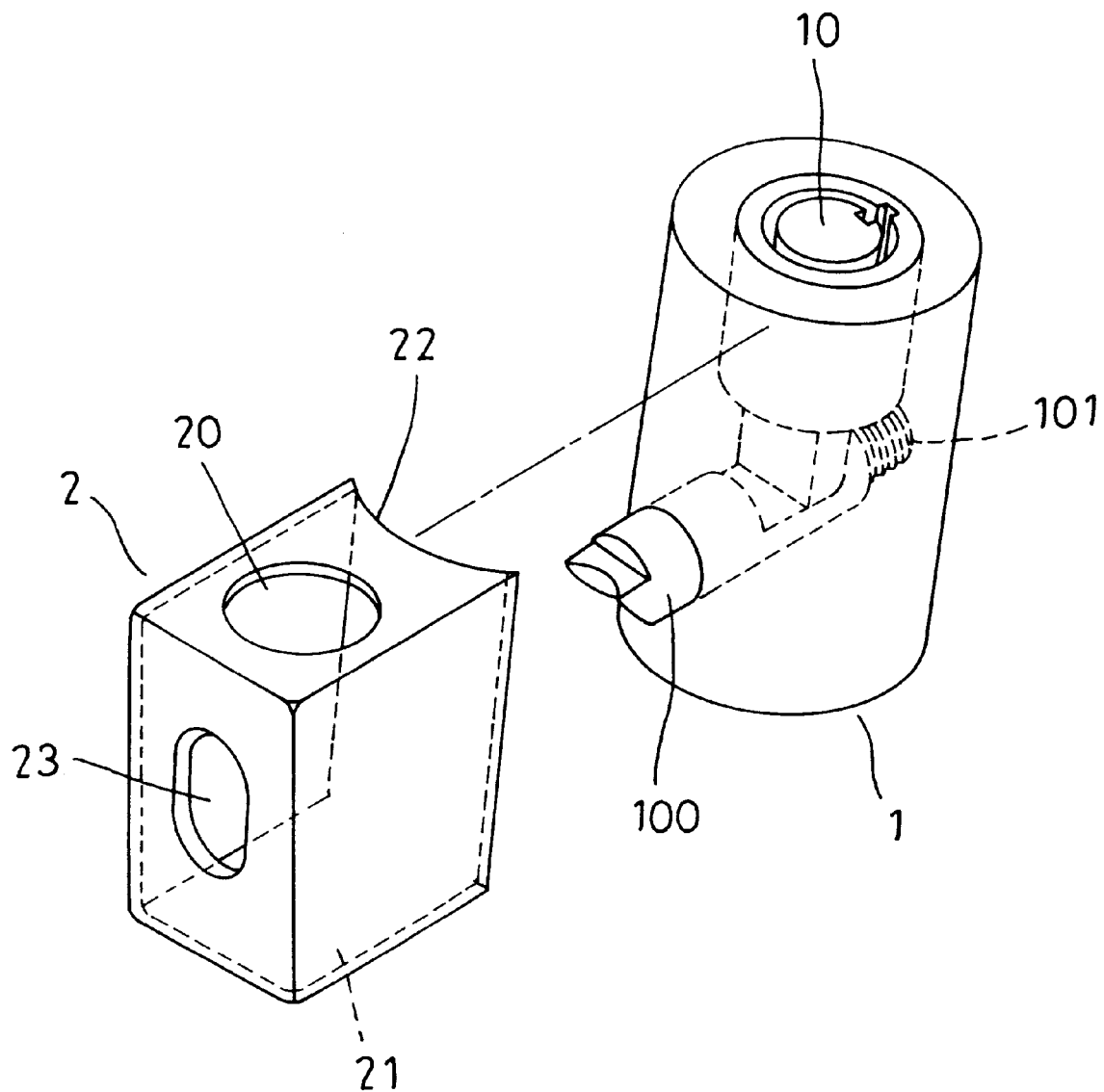
FIG. 1 is an exploded perspective view of a locking means housing for an automobile steeling wheel lock in the present invention.
Figure 2:
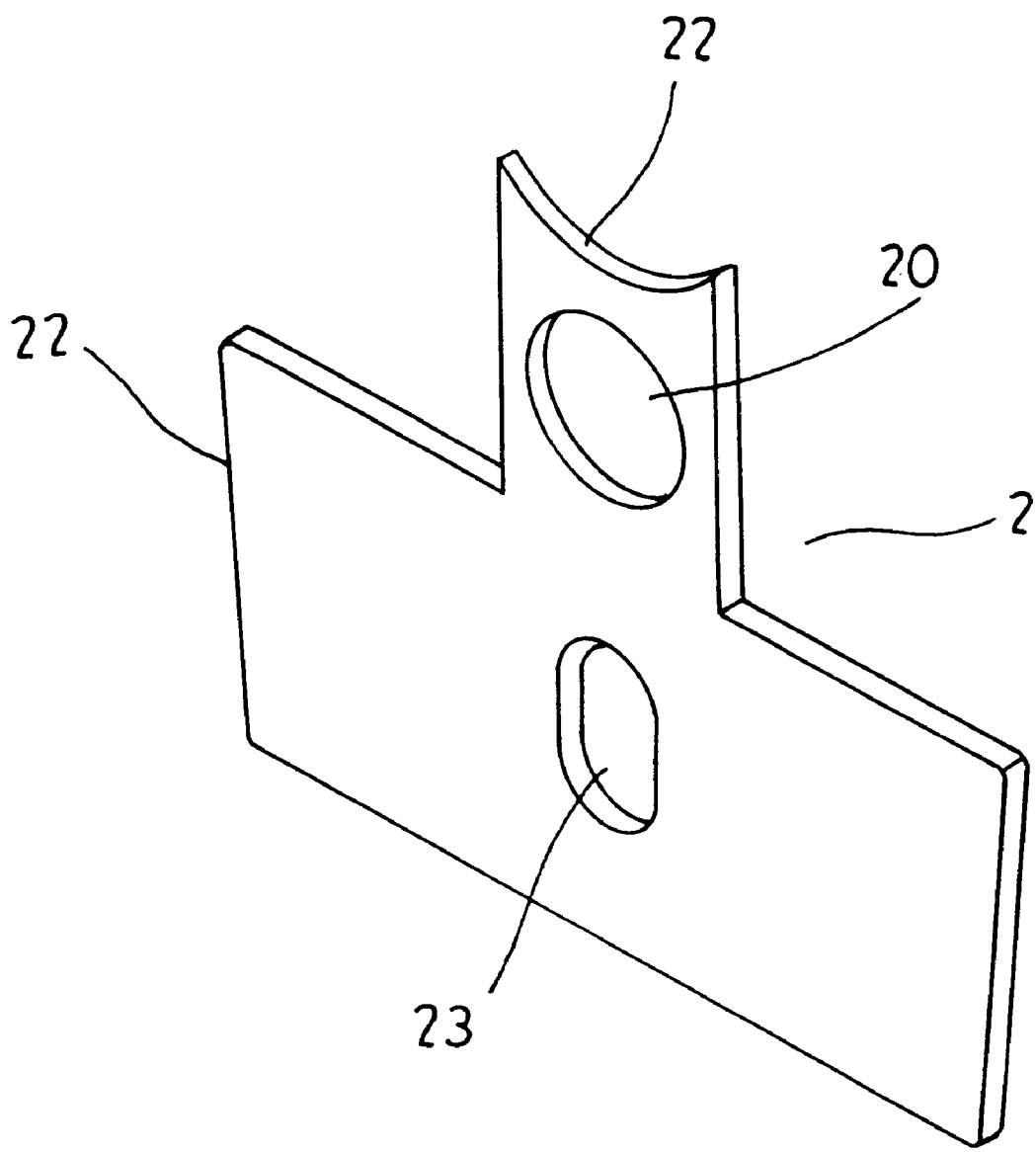
FIG. 2 is a perspective view of a spread condition of the locking means housing in the present invention.
Figure 3:
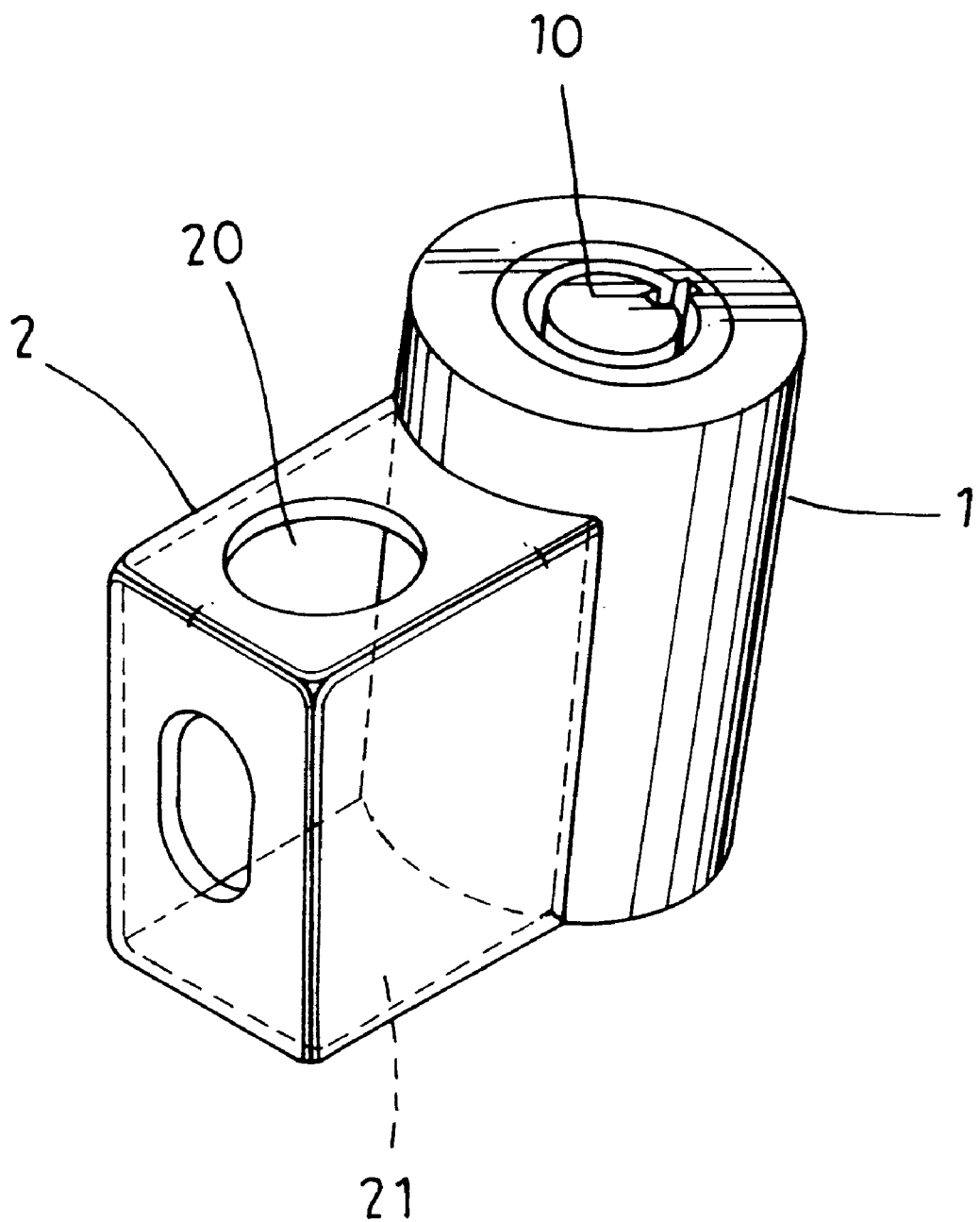
FIG. 3 is a perspective view of the locking means housing for an automobile steeling wheel lock in the present invention; and, FIG. 4 is a perspective view of the locking means housing combined with an automobile steeling wheel lock in the present invention.

A preferred embodiment of a locking means housing for an automobile steeling wheel lock in the present invention, as shown in FIGS. 1, 2, 3 and 3, includes a circular tubular body 1, and a locking means 10 positioned in the circular tubular body 1 and having a deadbolt 100 with its end extending out of the body 1 and a spring 101 pushing the deadbolt 100, and a connector 2 as main components combined together.

Figure 4:
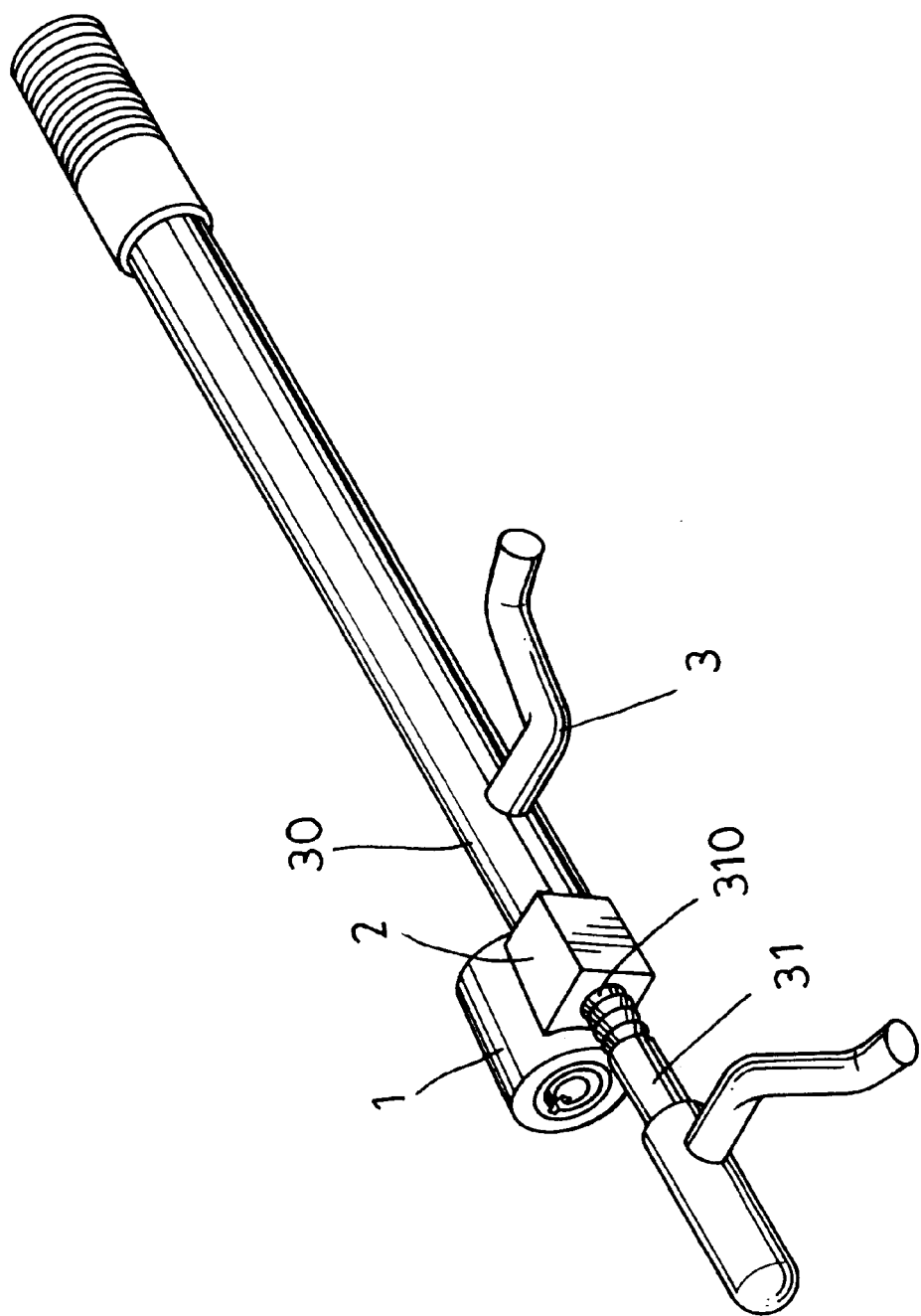

The connector 2 is firmly combined with one side of the circular tubular body 1, made of a flat metal plate bent into a case-shape as shown in FIGS. 1 and 2, having an inner hollow space 21 to permit the outer end of the deadbolt 100 to extend therein, a hole 20 communicating with the inner hollow space 21 and a concave contact edge 22 formed in an inner upper side to contact an outer surface of the circular tubular body 1, and a view hole 23 bored in a front side. The connector 2 is for an extensible steering wheel locking rod 3 to pass through, and the extensible steering wheel locking rod 3 consists of a cylinder portion 30 and a smaller diameter rod 31, as shown in FIG. 4, with the inner end of the cylinder portion 30 extending in the hollow space 21 of the connector 2 and with the smaller diameter rod 31 inserting in the hole 20 and then insert in the cylinder portion 30. The small diameter rod portion 31 has plural annular grooves 310 formed in inner end.

The deadbolt 100 of the locking means 10 has its inner end engages with one of said annular grooves 310 of the smaller diameter rod 31 to lock the automobile steering wheel lock on the steering wheel.

In assembling, firstly, a flat metal plate is cut to the preset size and shape to make the connector 2 as shown in FIG. 2, and then punched out the hole 20 and view hole 23 and then bent into the shape of the case-shaped connector 2 as shown in FIG. 1. Then the connector 2 is hardened by special treatment, and after that the connector 2 is combined firmly with the circular tubular body 1 by means of welding process, as shown in FIG. 3. Then the extensible steering wheel locking rod 3 is inserted in the connector 2, and a worker looks closely through the view hole 23 whether the small diameter rod 31 is aligned to the deadbolt 100 or not. In case the both are aligned completely, the view hole 23 is sealed up, finishing assembly of an automobile steering wheel lock with the locking means housing in the present invention, as shown in FIG. 4.

The locking means housing for an automobile steering wheel lock has the following advantages as can be understood from the aforesaid description.

1. The connector is made of a flat metal plate cut into the required shape and size, thus unnecessary to make a mold and, saving cost.

2. The connector 2 and the circular tubular body are separately treated to have hardened outer surfaces by special treatment, increasing the strength of the whole structure to prevent the lock from illegal breakage to and upgrade the anti-theft effect.

3. Manufacturing process of the connector is simplified, effectively enhancing working efficiency, having worthiness for utilizing in industry.

While the preferred embodiment of the invention has been described above, it will be recognized and understood that various modifications may be made therein and the appended claims are intended to cover all such modifications that may fall within the spirit and scope of the invention.

What is claimed is:

1. A lock housing for an automobile steering wheel lock comprising a circular tubular body for containing a locking means and a connector of a case shape, said locking means including a deadbolt and a spring, said circular tubular body and said connector being welded together tightly, said deadbolt having an outer end extending in said connector, an elongate automobile steering wheel locking rod including an elongate cylinder portion and a small diameter rod portion, said small diameter rod portion having a plurality of annular grooves formed in an inner end section; wherein said connector being of a case shape and made of a flat metal plate bent to define an inner hollow space, an outer side of said connector bored with a hole for said inner end section of said small diameter rod portion with said annular grooves to insert therein, an inner side of said connector being open for said inner end of said cylindrical portion to insert and fit therein, said deadbolt having an inner end extending in said connector to engage one of said annular grooves of said small diameter rod portion to lock said automobile steering wheel lock, said connector being hardened by treatment after being bent into shape and then welded with said circular tubular body to intensify the strength of the whole lock housing.

\* \* \* \* \*